UNITED STATES PATENT OFFICE.

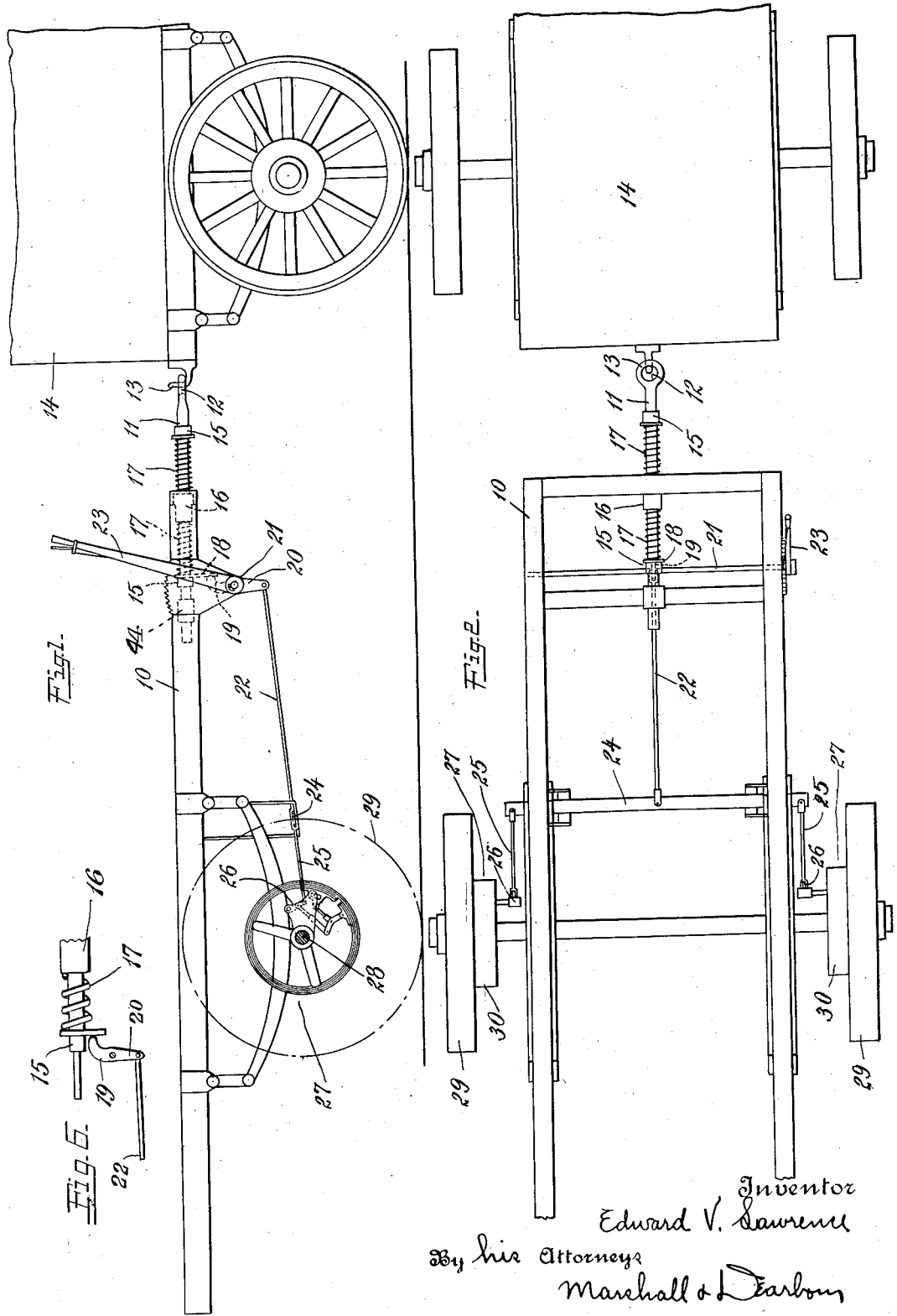

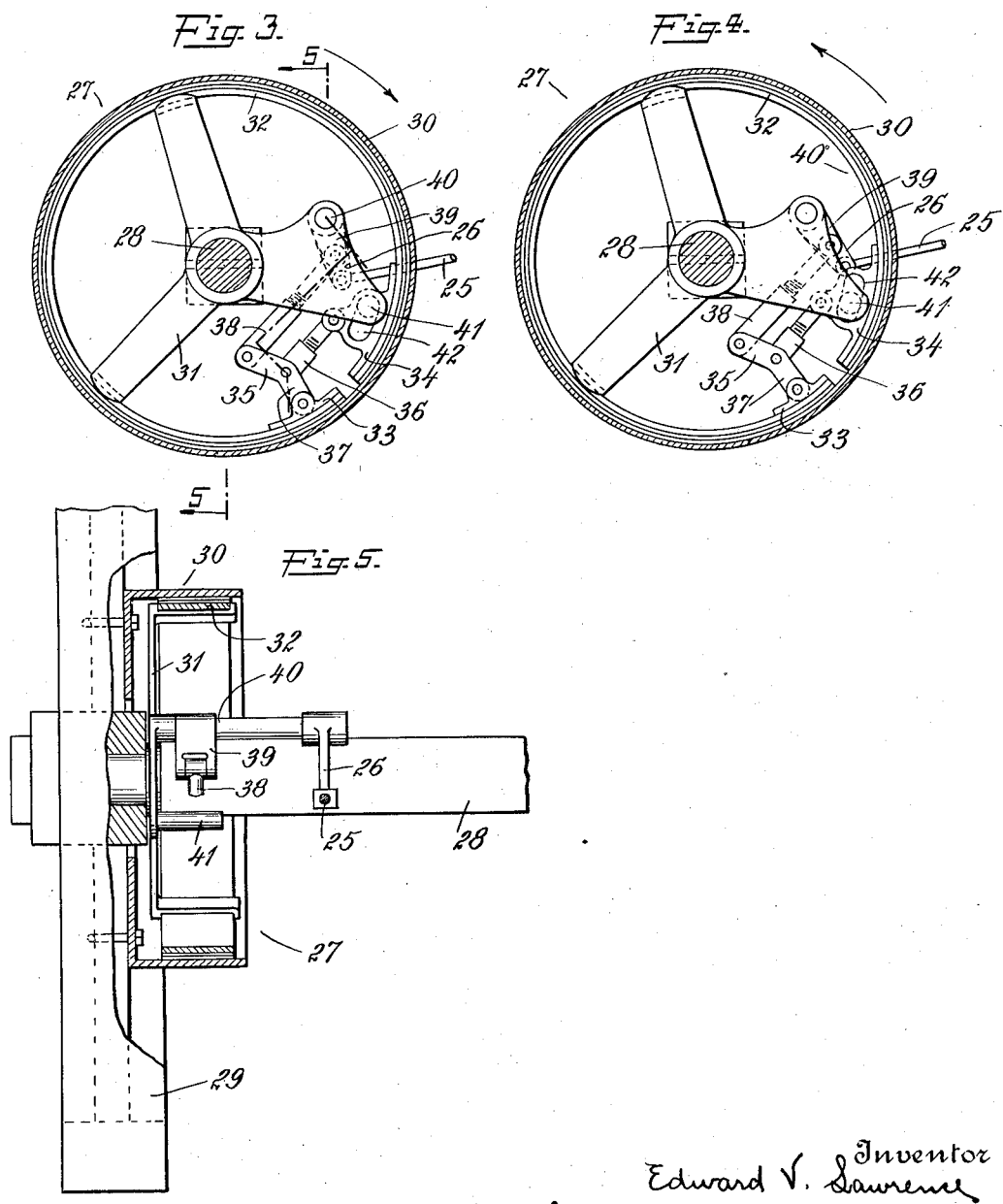

EDWARD V. LAWRENCE, OF ENGLEWOOD, NEW JERSEY, ASSIGNOR TO E. V. LAWRENCE SAFETY BRAKE COMPANY, INC., OF NEW YORK, N. Y., A CORPORATION OF NEW YORK.

AUTOMOBILE-BRAKE.

1,350,318.   Specification of Letters Patent.   Patented Aug. 24, 1920.

Application filed August 8, 1918. Serial No. 248,870.

*To all whom it may concern:*

Be it known that I, EDWARD V. LAWRENCE, a citizen of the United States of America, and a resident of Englewood, Bergen county, and State of New Jersey, have invented certain new and useful Improvements in Automatic Brakes, of which the following is a specification, reference being had to the accompanying drawings, forming a part thereof.

My invention relates to automatic brakes and has special reference to those of the type shown and described in my Patent No. 1,271,916 granted July 9, 1916, filed July 13, 1916, as a continuation of application S. #9504 filed February 20, 1915. This application is furthermore in part a continuation of my application S. #11978 filed July 28, 1916.

My present invention relates to improvements in the structures shown in the applications above mentioned and it relates to brake mechanisms which are particularly adapted for two wheel trailers or semi-trailers.

One object of my invention is to provide an improved brake structure that shall be simple and durable and particularly adapted for use on trailers having a spring connected draw bar which is adapted to be connected to the trail hook of a tractor.

In order that my invention may be thoroughly understood I will now proceed to described the same in the following specification, and will then point out the novel features thereof in appended claims.

Referring to the drawings:

Figure 1 is an elevation of a two-wheel trailer with one of the wheels broken away and the axle shown in section to disclose the brake mechanism which is arranged and constructed in accordance with my invention. The view also includes the rear end of the truck to which the trailer is connected.

Fig. 2 is a plan view of the trailer chassis and the rear end of the vehicle as shown in Fig. 1.

The brake mechanism is shown on a larger scale in Figs. 3 and 4, the arrangement of Fig. 3 showing the brake released and the trailer moving in a forward direction.

Fig. 4 shows the brake mechanism released by the backward turning of the trailer wheels under the backing conditions.

Fig. 5 is a sectional elevation on the line 5—5 of Fig. 3.

Fig. 6 shows the brake actuating arm of the draw bar and associated parts in detail.

The trailer 10 is provided with a draw bar 11 formed at its outer end into a loop or eye 12 which is adapted to engage the trail hook 13 of any suitable motor truck or tractor which is indicated at 14. The draw bar has spaced enlargements 15 and extends through a bearing 16, compression springs 17 being interposed between the bearing and the respective enlargements. The arrangement is such that the springs tend to center the draw bar but the latter has certain lost motion to prevent shock at starting and stopping.

Attached to the draw bar is a plate or actuating arm 18 which is adapted to engage the upper arm 19 of a lever 20. This lever is affixed to a transverse pivot shaft 21 and is connected to a brake actuating rod 22. In the arrangement illustrated a hand lever 23 is secured to the shaft 21 at one end, but a lost motion connection is established between the two so that the action of the brake is independent of the hand lever when the latter is released.

The actuating rod 22 is connected to the middle point of an equalizing bar 24 which extends transversely of the trailer and is connected near its ends by links or rods 25. The links 25 are connected to brake actuating levers 26 which form parts of a pair of brake mechanisms 27 with which the trailer wheels are equipped. These mechanisms are similar and only one will be described in detail.

Referring to Figs. 3, 4 and 5— 28 designates the axle of the trailer which is supported on wheels 29. A brake drum 30 is secured to each wheel and a spider or bracket 31 is affixed to the axle adjacent to each wheel and has a plurality of arms which support and guide an expandible brake band or shoe 32. The band or shoe has abutments 33 and 34 at its respective ends and a bell crank lever 35 is connected at an intermediate point by an adjustable link 36 to the abutment 34 and one of its arms 37 is pivotally connected directly to the abutment 33. The other arm of the bell crank lever is connected by an adjustable link 38 to a lever 39 pivoted at 40 on the bracket 31. This lever is connected to one of the actuating rods 25.

One arm of the spider or bracket 31 is provided with a pin 41 which extends into a circumferential slot 42 in the brake shoe abutment 34. There is thus a lost motion connection between the brake shoe and the spider or bracket 31 which is affixed to the axle.

The arrangement of parts is such that when the brake is released the brake actuating parts occupy the full line position in Fig. 3 and if the brake is set when the wheel is moving in a forward direction the friction between the shoe and the brake drum on the wheel holds the shoe in such position that the pin 41 is maintained at the upper end of the slot 42 as shown in Fig. 3. If, under these conditions, the tractor is brought to a stop, or is holding the trailer on a down grade, the tendency is for the trailer to push the truck forward and this tendency causes a relative movement between the draw bar 11 and the trailer and is such that the projection 18 actuates the lever 20 so as to produce a pull on the rod 22 and on the bars or rods 25 which are connected thereto by the equalizer 24. The pull on each of the rods 25 swings the center of the lever 29 into the dotted line position of Fig. 3. This movement actuates the bell crank lever 35 and tends to force the shoe abutments 33 and 34 apart. The brake is thus applied and the force of the application is dependent on the force exerted by the trailer against the tractor.

It is evident that this force is dependent on a number of factors such as the weight of the tractor including its load, the grade on which the truck is operating and its speed as well as the rate of retardation when the truck is stopped.

When the truck is backing the trailer, the projection 18 acts upon the lever 19 as in the case of the trailer pushing against the truck and therefore has the tendency to set the brake, but this tendency is annulled by the first backward rotative movement of the trailer wheel which carries the brake shoe with it and takes up the circumferential lost motion due to the slot 42. This movement is sufficient to release the brake even though the lever 20 is in a position corresponding to a brake application.

The brake setting levers 20 and 26 cannot be overset except by hand because the setting movement of the draw bar 11 is limited, as clearly shown in Fig. 1, by spacing of an enlargement 15 from the adjacent bearing 44, or by the power of the spring 17 or by both.

The trailer illustrated may be provided with any suitable body and may constitute a carriage on which a field gun or mortar is mounted.

A structure of preferred form and construction has been illustrated and described for the purpose of showing a way in which this invention may be used, but the inventive thought upon which this application is based, is broader than this illustrative embodiment thereof, and I therefore intend no limitations other than those imposed by the appended claims.

What I claim is:

1. An automatic brake for trailers comprising a brake actuating lever having a relatively stationary pivot, a brake drum having an internal brake surface, an expandible ring or shoe coöperating with the surface of the drum and having abutments at its respective ends, a brake setting lever connected at one end to one of the abutments, a link connecting an intermediate point of the brake setting lever to the other abutment, and means for connecting the actuating lever to the brake setting lever, said expandible ring or shoe being circumferentially adjustable to release the brake in response to the backward turning movement of the drum.

2. An automatic brake for trailers comprising a brake actuating lever having a relatively stationary pivot, a brake drum having an internal brake surface, an expandible ring or shoe coöperating with the surface of the drum and having abutments at its respective ends, a brake setting lever connected at one end to one of the abutments, a link connecting an intermediate point of the brake setting lever to the other abutment, and an adjustable link connecting the actuating lever to the outer end of the brake setting lever; and a relatively fixed means for permitting a limited circumferential adjustment of the brake shoe in response to a backward turning movement of the drum.

3. An automatic brake for trailers comprising a brake actuating lever having a relatively stationary pivot, a brake drum having an internal brake surface, an expandible ring or shoe coöperating with the surface of the drum and having abutments at its respective ends, a brake setting lever connected at one end to one of the abutments, a link connecting an intermediate point of the brake setting lever to the other abutment, and means adapted to act in a tangentially backward direction relative to the drum rotation, corresponding to a forward movement of the trailer for connecting the actuating lever to the brake setting lever, and means for permitting a limited circumferential adjustment of the brake shoe in response to a backward turning movement of the drum.

4. An automatic brake for trailers comprising a brake drum affixed to a trailer wheel, and an expandible brake shoe within the drum, a stationary brake supporting member secured to the trailer axle adjacent to the wheel, means on the supporting member for permitting a limited circumferential adjustment of the shoe, an actuating lever pivotally mounted on the supporting member, a brake setting lever connected at one end to one end of the expandible shoe and at the other end to the actuating lever, a link connecting an intermediate point in the brake setting lever to the opposite end of the brake shoe, and means having a limited movement in response to movements of the trailer relative to its tractor for setting the actuating lever.

5. An automatic brake band for a trailer having an axle and wheels thereon, comprising a brake drum for each wheel, an expandible brake shoe within the drum, a stationary brake supporting member secured to the axle adjacent to the wheel, means on the supporting member for permitting a limited circumferential adjustment of the shoe, an actuating lever pivotally mounted on the supporting member, a brake setting lever adjustably connected at one end to one end of the expandible shoe and at the other end to the actuating lever, an adjustable link connecting an intermediate point in the brake setting lever to the opposite end of the brake shoe, and means having a limited movement in response to movements of the trailer relative to its tractor for setting the actuating lever.

6. A trailer comprising a draw bar, resilient means for centering the draw bar arranged to permit a limited forward and back movement of the trailer relative to the draw bar, and an axle for the trailer, wheels thereon, a brake drum secured to each wheel, an expandible brake shoe within the drum, a relatively stationary spider secured to the axle and having a plurality of arms for supporting the expandible brake shoe, an actuating lever pivotally mounted on the spider, means on the spider for permitting a limited rotative adjustment of the shoe relative to the spider, and adjustable gearing for connecting the actuating lever to expand the band, levers being so arranged that the brakes are released by the limited rotative movement of the shoe although the limited movement of the trailer relative to the draw bar tends to set the brake.

7. A trailer comprising a draw bar adapted to be coupled to a tractor, resilient means for centering the draw bar arranged to permit a limited forward and back movement of the trailer relative to the draw bar, an axle for the trailer, wheels thereon, a brake drum secured to each wheel, an expandible brake shoe with the drum, a relatively stationary spider secured to the axle and having a plurality of arms for supporting the expandible brake shoe, an actuating lever pivotally mounted on the spider, means on the spider for permitting a limited rotative adjustment of the shoe relative to the spider, adjustable gearing for connecting the actuating lever to expand the band, and means responsive to the forward and back movement of the trailer relative to the tractor for actuating the lever to a predetermined extent dependent on the said limited movement of the trailer relative to the draw bar, said rotative adjustment permitting a sufficient movement of the shoe to release the brake.

8. A trailer comprising means for coupling to a tractive element, a brake actuating means adapted to be moved automatically to a limited extent in response to the relative movements between the trailer and its tractive element, a brake drum on a trailer wheel, a relatively stationary support, a brake member mounted thereon and adapted to coöperate with the drum, and a brake setting gearing arranged to set the brake under movement of the automatic brake actuating means for forward wheel rotation and dependent upon a predetermined adjustment of the brake member to release the brake in spite of the automatic actuating means.

9. A trailer comprising means for coupling to a tractive element, a brake actuating means adapted to be moved automatically to a limited extent in response to the relative movements between the trailer and its tractive element, a brake drum on a trailer wheel, a relatively stationary support, a brake member mounted thereon to permit a rotative movement relative thereto and adapted to coöperate with the drum, and a brake setting gearing arranged to set the brake under movement of the automatic brake actuating means for forward wheel rotation and dependent upon said rotative adjustment of the brake member to release the brake in spite of the automatic brake actuating means.

10. A trailer comprising means for coupling to a tractive element, a brake actuating means adapted to be moved automatically to a limited extent in response to the relative movements between the trailer and its tractive element, a brake drum on a trailer wheel, a relatively stationary support, a brake member mounted thereon to permit a rotative movement relative thereto and adapted to coöperate with the drum, a brake setting gearing arranged to set the brake under movement of the automatic brake actuating means for forward wheel rotation and dependent upon said rotative adjustment of the brake member to release the brake in spite of the automatic brake actuating means, and an auxiliary means for setting the brake independent of the wheel rotation.

In witness whereof, I have hereunto set my hand this 27 day of June, 1918.

EDWARD V. LAWRENCE.